(12) United States Patent
Zhang et al.

(10) Patent No.: US 12,275,474 B2
(45) Date of Patent: Apr. 15, 2025

(54) VEHICLE STEERING KNUCKLE AND VEHICLE HAVING THE SAME

(71) Applicants: Zhejiang Geely Holding Group Co., Ltd., Hangzhou (CN); Zhejiang Liankong Technologies Co., Ltd., Ningbo (CN)

(72) Inventors: Zhongxiao Zhang, Hangzhou (CN); Huicai Lu, Hangzhou (CN); Liyou Li, Hangzhou (CN)

(73) Assignees: Zhejiang Geely Holding Group Co., Ltd., Hangzhou (CN); Zhejiang Liankong Technologies Co., Ltd., Ningbo (CN)

( * ) Notice: Subject to any disclaimer, the term of this patent is extended or adjusted under 35 U.S.C. 154(b) by 0 days.

(21) Appl. No.: 18/292,938

(22) PCT Filed: Jun. 17, 2022

(86) PCT No.: PCT/CN2022/099340
§ 371 (c)(1),
(2) Date: Jan. 29, 2024

(87) PCT Pub. No.: WO2023/005490
PCT Pub. Date: Feb. 2, 2023

(65) Prior Publication Data
US 2024/0359737 A1    Oct. 31, 2024

(30) Foreign Application Priority Data

Jul. 29, 2021    (CN) .......................... 202110863354.9

(51) Int. Cl.
*B62D 7/18*    (2006.01)
*B62D 7/16*    (2006.01)

(52) U.S. Cl.
CPC .................... *B62D 7/18* (2013.01); *B62D 7/16* (2013.01)

(58) Field of Classification Search
CPC .... B62D 7/16; B62D 7/18; B60R 2021/0009; B60R 2021/0023; B60G 2206/016; B60G 2206/50
See application file for complete search history.

(56) References Cited

U.S. PATENT DOCUMENTS 7,762,568 B2 *    7/2010    Tatsumi ............... B62D 25/082
                                                       280/124.145
8,573,615 B2 *    11/2013    Kuwabara ................ B60G 3/06
                                                       280/124.145
(Continued)

FOREIGN PATENT DOCUMENTS

CN          109689481 A        4/2019
CN          110386220 A        10/2019
(Continued)

OTHER PUBLICATIONS

International search report of PCT patent application No. PCT/CN2022/099340 issued on Aug. 29, 2022.
(Continued)

*Primary Examiner* — Laura Freedman
(74) *Attorney, Agent, or Firm* — Andrew C. Cheng

(57) ABSTRACT

A vehicle steering knuckle and a vehicle are provided. The vehicle steering knuckle includes a connecting portion, a weakening portion, a first positioning portion and a second positioning portion. The weakening portion and the first positioning portion are provided on the connecting portion; the first positioning portion is connected to a vehicle steering rod, and the second positioning portion is connected to a vehicle front suspension frame; one end of the weakening portion is connected to the connecting portion, the other end of the weakening portion is connected to the first positioning portion. The weakening portion includes at least one notch and at least one arc portion. The arc portion is provided at a connection position between the weakening portion and the first positioning portion, and the notch is provided in the arc portion, so as to enable the vehicle steering rod to break the weakening portion.

16 Claims, 2 Drawing Sheets

(56) References Cited

U.S. PATENT DOCUMENTS

| | | | |
|---|---|---|---|
| 8,646,793 B1 | 2/2014 | Lam | |
| 10,822,027 B2 * | 11/2020 | Karlsson | B62D 7/18 |
| 10,889,326 B2 * | 1/2021 | Klinger | B62D 21/15 |
| 11,230,350 B2 * | 1/2022 | Braedt | B62M 9/121 |
| 11,584,440 B2 * | 2/2023 | Hammer | B62D 25/08 |
| 2015/0246692 A1 | 9/2015 | Rangaswamaiah | |
| 2021/0339799 A1 * | 11/2021 | Tonini | B62D 15/023 |

FOREIGN PATENT DOCUMENTS

| | | | |
|---|---|---|---|
| CN | 110510000 A | 11/2019 | |
| CN | 210212523 U | 3/2020 | |
| CN | 113443006 A | 9/2021 | |

OTHER PUBLICATIONS

Search report of CN patent application No. 2021108633549 issued on Apr. 6, 2022.

* cited by examiner

VEHICLE STEERING KNUCKLE AND VEHICLE HAVING THE SAME

CROSS-REFERENCE TO RELATED APPLICATIONS

The present document is a 35 U.S.C. § 371 National Phase conversion of International (PCT) Patent Application No. PCT/CN2022/099340, filed on Jun. 17, 2022. The PCT International Patent Application was filed and published in Chinese.

TECHNICAL FIELD

The present document relates to a field of automotive technology, and in particular to a vehicle steering knuckle and a vehicle having the same.

DESCRIPTION OF RELATED ART

As the development of the automotive industry becomes more mature, and with the continuous development of the global economy and the increase in people's travel requirements, cars have become an indispensable means of transportation. Cars have brought many conveniences to people's travel and also brought unprecedented opportunities to the automotive consumer market. The number of household cars has increased unprecedentedly, which has promoted the further development of the automotive industry. However, at the same time, the problems brought about are also very obvious, and the number of traffic accidents is constantly increasing, especially when the front of the vehicle is involved in a small-scale overlapping collision, the car will be severely deformed by the collision. The large deformation of the passenger compartment seriously compresses the living space of the passengers, resulting in serious collision injuries or even death to the vehicle occupants.

According to the traditional collision design strategy, when a car undergoes a small partial overlap collision with a 25% overlap in the front, the steering knuckle is broken down after hitting the door sill to unload the collision force. Therefore, the door sill structure needs to be strong enough to stand the collision of the steering knuckle on one hand, and to keep its small collision deformation on the other hand. Such a door sill structure will undergo unpredictable and severe deformation in a complex high-speed collision, which compresses the living space of passengers. CN110510000A discloses a front wheel hub assembly disconnection device for road vehicles, which is constructed to facilitate the disconnection and outward movement of the front wheel hub assembly from the body structure during SPOC. In small partial overlap collision, the steering knuckle of the front wheel hub assembly moves towards and collides with the steering knuckle breaker, causing the steering knuckle breaker to fracture the steering knuckle and disconnect the steering knuckle from the hub of the front wheel hub assembly.

When a car encounters a small partial overlap collision, the unreasonably designed collision structure will cause excessive deformation of the passenger compartment structure due to poor collision force transmission, untimely collision force unloading, and insufficient collision energy absorption, which results in a serious shortage of the living space in the passenger compartment after the collision, and further leads to significant injuries to the passengers.

Based on the shortcomings of the traditional technology, there is an urgent requirement to research a vehicle steering knuckle and a vehicle to solve the above problems.

SUMMARY

In order to solve the above technical problems, the present document provides a vehicle steering knuckle and a vehicle having the same. The present document provides a weakening portion, and an arc portion and a notch on the weakening portion, so that the steering knuckle is broken by the vehicle steering rod at the weakening portion in the event of a collision, which effectively reduces the degree of collision deformation of the vehicle door sill and effectively provides sufficient living space for drivers and passengers.

The present document provides a vehicle steering knuckle, which includes a connecting portion, a weakening portion, a first positioning portion and a second positioning portion.

The weakening portion and the second positioning portion are both provided on the connecting portion. The first positioning portion is configured for connecting with a vehicle steering rod, and the second positioning portion is configured for connecting with a vehicle front suspension frame.

One end of the weakening portion is fixedly connected to the connecting portion, other end of the weakening portion is fixedly connected to the first positioning portion. The weakening portion includes at least one notch and at least one arc portion. The arc portion is disposed at a connection position between the weakening portion and the first positioning portion. The notch is disposed on the arc portion so that the vehicle steering rod can break the weakening portion in an event of a collision.

Furthermore, the number of the arc portions is two, and the two arc portions are arranged at opposite sides of the weakening portion.

Furthermore, the weakening portion includes a first connection surface, a second connection surface and a third connection surface;

One end of the first connection surface is connected to one end of the second connection surface, other end of the second connection surface is connected to the third connection surface;

The first connection surface, the second connection surface and the third connection surface are all connected to a sidewall of the first positioning portion;

A first mounting hole is provided on the second connection surface, and a vehicle brake disc is connected to the weakening portion through the first mounting hole.

Furthermore, one of the arc portions is provided on the first connection surface, and the one of the arc portions is provided at a connection position between the first connection surface and the sidewall of the first positioning portion;

Other one of the arc portions is provided on the third connection surface, and the other one of the arc portions is provided at a connection position of the third connection surface and the sidewall of the first positioning portion.

Furthermore, a length of the connection position between the first connection surface and the connecting portion is a first length, and the first length is equal to a length of the arc portion provided on the first connection surface;

A length of the connection position between the third connection surface and the connecting portion is a second length, and the second length is equal to a length of the arc portion provided on the third connection surface.

Furthermore, the weakening portion further includes a fourth connection surface, the fourth connection surface is opposite to the second connection surface, and opposite ends of the fourth connection surface are connected to the first connection surface and the third connection surface respectively.

The fourth connection surface is provided with a reinforcing rib for strengthening an axial strength of the first positioning portion. The reinforcing rib encloses a weakening groove on the fourth connection surface. The weakening groove is configured for reducing an axial strength of the weakening portion.

Furthermore, the first connection surface is a concave arc surface, and an orientation of the concave arc surface is identical to an orientation of the arc portion, and the second connection surface is a planar surface.

Furthermore, a second mounting hole is provided on the connecting portion, and a vehicle transmission shaft passes through the second mounting hole, so that the vehicle transmission shaft is connected to the connecting portion.

Furthermore, the number of the notches is two, each of the arc portions is provided with one notch, and the notches are configured in square, trapezoid or arc shape.

On the other hand, the present document also provides a vehicle, which includes a vehicle steering rod, a vehicle front suspension frame, a vehicle transmission shaft and the vehicle steering knuckle as described above;

The vehicle steering rod, the vehicle front suspension frame and the vehicle transmission shaft are respectively fixedly connected to the vehicle steering knuckle.

Implementing the embodiments of the present document has the following beneficial effects:
1. The present document provides a weakening portion, and an arc portion and a notch on the weakening portion, so that the vehicle steering knuckle is broken by the vehicle steering rod at the weakening portion in an event of a collision, which effectively reduces the degree of collision deformation of the vehicle door sill and effectively provides sufficient living space for drivers and passengers.
2. On the basis that the vehicle steering knuckle of the present document meets the strength requirements of the vehicle, by setting fracture-inducing features such as the arc portion, the notch, and the reinforcing rib, the vehicle steering knuckle is more likely to break at the weakening portion, which can further reduce the collision pressure of the door sill structure and the design weight and cost of the door sill structure, and further can shorten the research and development cycle and reduce the development cost.

BRIEF DESCRIPTION OF THE DRAWINGS

In order to more clearly illustrate the technical solutions of the present document, the drawings required for the description of the embodiments or the prior art will be introduced briefly. Obviously, the drawings in the following description only show some of the embodiments of the present document. For those of ordinary skill in the art, other drawings may be obtained based on these drawings without creative efforts.

Figure 1:
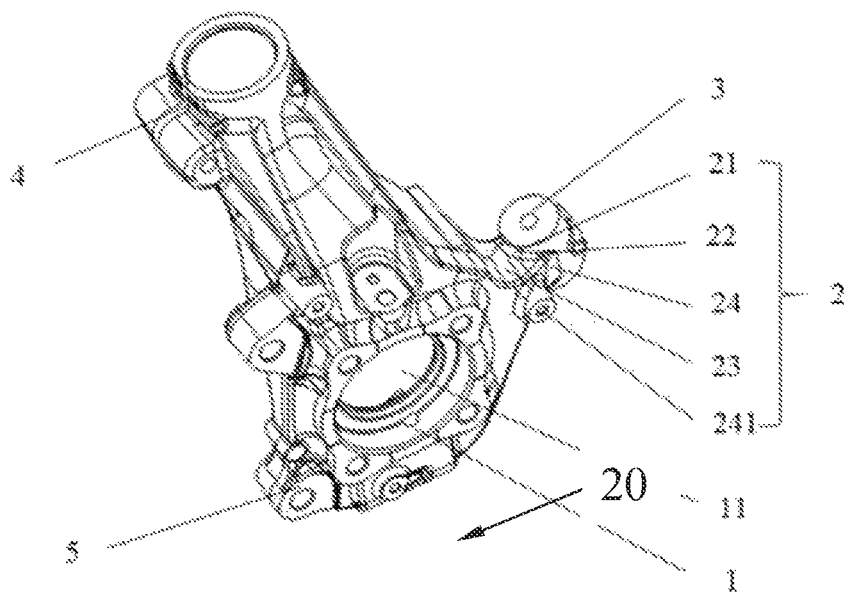
FIG. 1 is a structural diagram of a vehicle steering knuckle at a first angle of an embodiment of the present document.

Wherein, the reference numbers in the figures are correspond to:
1—connecting portion; 2—weakening portion; 3—first positioning portion; 4—second positioning portion; 5—third positioning portion; 11—second mounting hole; 21—arc portion; 22—notch; 23—first connection surface; 24—second connection surface; 25—third connection surface; 26—weakening groove; 27—reinforcing rib; 28—fourth connection surface; 241—first mounting hole.

DETAILED DESCRIPTION OF THE EMBODIMENTS

Specific embodiments of the present document will now be clearly and completely described below with reference to the accompanying drawings. Obviously, the described embodiments are only some of the embodiments of the present document, rather than all of the embodiments. Based on the description of the present document, all other embodiments obtained by a person of ordinary skill in the art without creative work shall fall within the protection scope of the present document.

It should be noted that the terms "first", "second", etc. in the description and claims of the present document, as well as the accompanying drawings, are used to distinguish similar objects, without necessarily describing a specific order or sequence. It is to be understood that the data so used are interchangeable under appropriate circumstances so that the embodiments of the present document described herein can be implemented in sequences other than those illustrated or described herein. In addition, the terms "including" and "having", as well as any variations thereof, are intended to cover non-exclusive inclusions. For example, a process, method, system, product, or apparatus that includes a series of steps or units are not limited to those clearly listed, but may include other steps or units that are not clearly listed or inherent to these process, method, product or apparatus. The first angle, the second angle, the third angle and the fourth angle in the specification are only used to distinguish the views under different angles of the vehicle steering knuckle. It has no other meaning and are not used to describe a specific order or sequence.

The traditional technology has the following shortcomings: according to the traditional collision design strategy, when the car undergoes a small partial overlap collision with a 25% overlap at the front, the steering knuckle breaks after hitting the door sill to unload the collision force, therefore, the door sill structure needs to be strong enough to stand the collision of the steering knuckle on one hand, to keep its small collision deformation on the other hand. Such a door sill structure will undergo unpredictable and severe deformation in a complex high-speed collision, which compresses the living space of passengers. When a car encounters a small partial overlap collision, the unreasonably designed collision structure will cause excessive deformation of the passenger compartment structure due to poor collision force transmission, untimely collision force unloading, and insufficient collision energy absorption, which results in a serious shortage of the living space in the passenger compartment after the collision, and further leads to significant injuries to the passengers.

In view of the shortcomings of the traditional art, the present document provides a weakening portion, and an arc portion and a notch on the weakening portion, so that the vehicle steering knuckle is broken by the vehicle steering rod at the weakening portion in an event of a collision, which effectively reduces the degree of collision deformation of the vehicle door sill and effectively provides sufficient living space for drivers and passengers. On the basis that the vehicle steering knuckle meets the strength requirements of the vehicle, by setting fracture-inducing features such as the arc portion, the notch, and the reinforcing rib, the vehicle steering knuckle is more likely to break at the weakening portion, which can further reduce the collision pressure of the door sill structure and the design weight and cost of the door sill structure, and further can shorten the research and development cycle and reduce the development cost.

Embodiment 1

Figure 2:
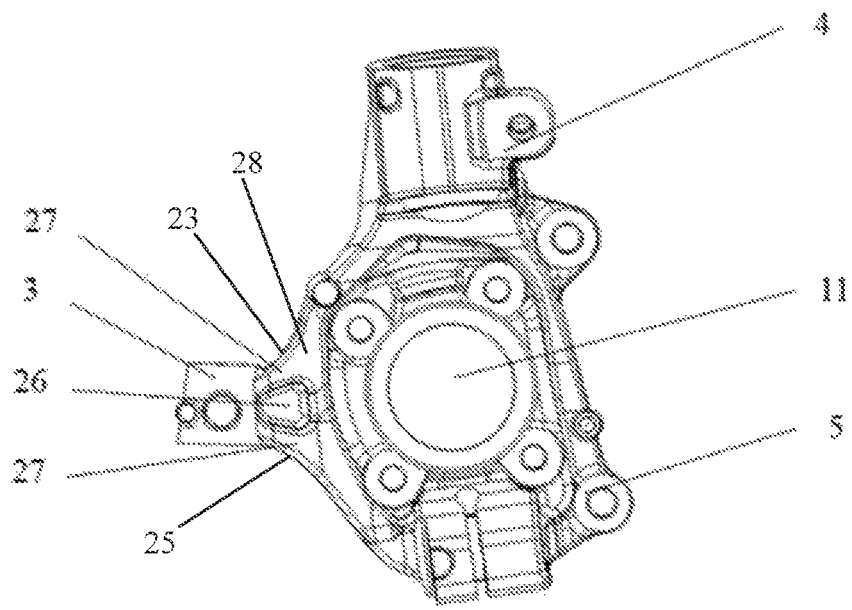
FIG. 2 is a structural diagram of the vehicle steering knuckle at a second angle of the embodiment of the present document.
Figure 3:
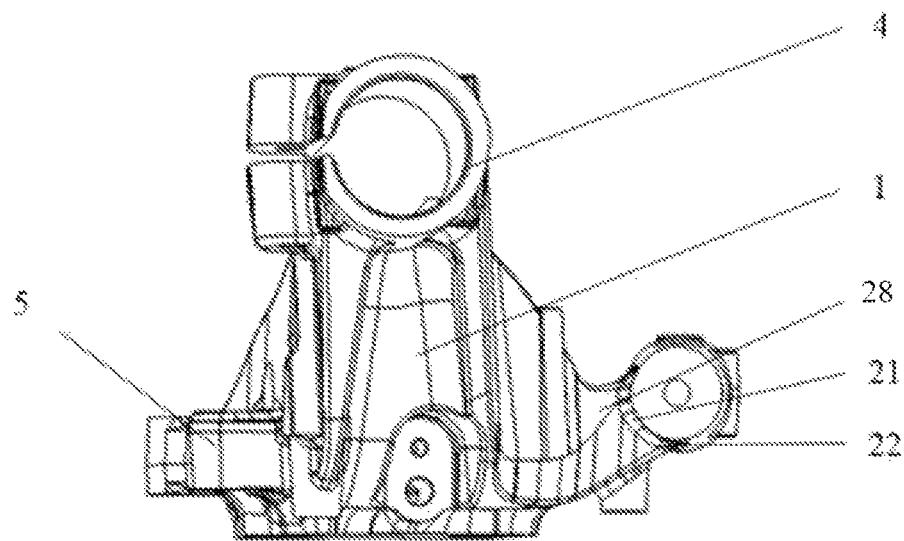
FIG. 3 is a structural diagram of the vehicle steering knuckle at a third angle of the embodiment of the present document.
Figure 4:
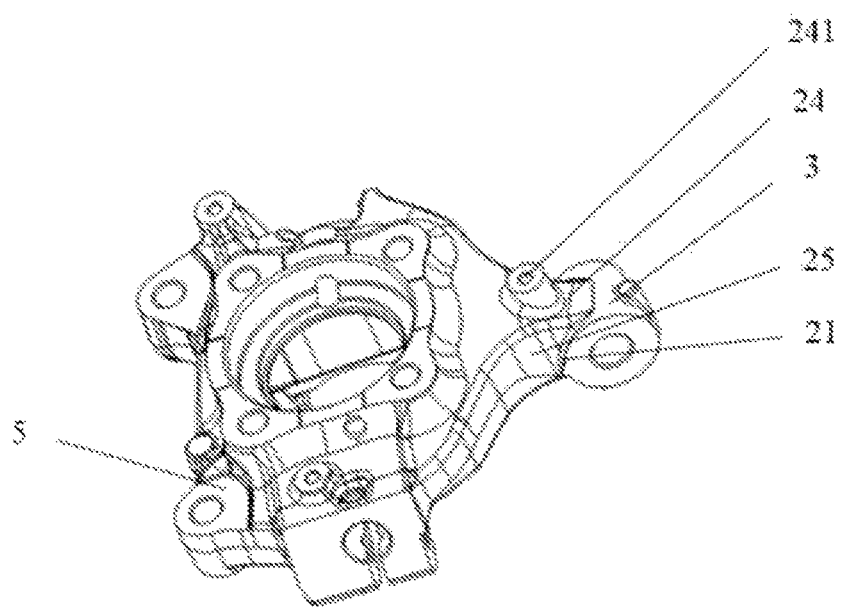
FIG. 4 is a structural diagram of the vehicle steering knuckle at a fourth angle of the embodiment of the present document.

Referring to FIGS. 1 to 4, an embodiment of the present document provides a vehicle steering knuckle, which includes a connecting portion 1, a weakening portion 2, a first positioning portion 3, and a second positioning portion 4.

The weakening portion 2 and the second positioning portion 4 are both arranged on the connecting portion 1. The first positioning portion 3 is configured for connecting with a vehicle steering rod, and the second positioning portion 4 is configured for connecting with a vehicle front suspension frame.

One end of the weakening portion 2 is fixedly connected to the connecting portion 1, other end of the weakening portion 2 is fixedly connected to the first positioning portion 3. The weakening portion 2 includes at least one notch 22 and at least one arc portion 21. The at least one arc portion 21 is set at a connection position between the weakening portion 2 and the first positioning portion 3, and the at least one notch 22 is set on the at least one arc portion 21, so that the vehicle steering rod can break the weakening portion 2 in an event of a collision.

It should be noted that in this embodiment, when the vehicle encounters a collision, the vehicle steering rod breaks the weakening portion 2 between the first positioning portion 3 and the connecting portion 1 before the vehicle door sill hitting the vehicle steering knuckle, which effectively reduces the degree of collision deformation of the vehicle door sill and effectively provides sufficient living space for drivers and passenger. In this embodiment, by means of setting the weakening portion 2, and the arc portion 21 and the notch 22 on the weakening portion 2, the vehicle steering knuckle is broken by the vehicle steering rod at the weakening portion 2 during collision, which effectively reduces the degree of collision deformation of the vehicle door sill and effectively provides sufficient survival space for drivers and passengers.

It should also be noted that in this embodiment, the vehicle steering knuckle is designed and used for vehicles developed under a small partial overlap collision with a 25% overlap at the front. The vehicle steering knuckle is able to collapse without hitting the vehicle door sill. Furthermore, on the basis that the vehicle steering knuckle meets the strength requirement of the vehicle, fracture-inducing features such as the arc portion 21, and the notch 22 are provided to make it easier for the vehicle steering knuckle to break at the weakening portion 2, which can further reduce the collision pressure of the door sill structure and the design weight and cost of the door sill structure, and further can shorten the research and development cycle and reduce the development cost.

It should also be noted that in this embodiment, a reasonable vehicle steering knuckle is designed on the basis of comprehensively considering the collision deformation of the vehicle steering rod, the vehicle steering knuckle and the vehicle door sill, which effectively reduces the vehicle door sill collision requirements and improves the integrity of the passenger compartment in the front 25% small partial overlap collision test. By means of effectively utilizing the act of the vehicle steering rod to the weakening portion 2 of the vehicle steering knuckle, the vehicle steering knuckle is broken laterally before the vehicle steering knuckle collides with the vehicle door sill, and the wheels are laterally separated from the vehicle, thereby unloading the collision force and reducing the collision strength requirements of the vehicle body structure, which provides an effective development strategy of front 25% small partial overlap collision for many models of vehicles developed later.

Preferably, the weakening portion 2 includes a first connection surface 23, a second connection surface 24, and a third connection surface 25. One end of the first connection surface 23 is connected to one end of the second connection surface 24, other end of the second connection surface 24 is connected to the third connection surface 25. The first connection surface 23, the second connection surface 24, and the third connection surface 25 are all connected to a sidewall of the first positioning portion 3. The second connection surface 24 is provided with a first mounting hole 241. A vehicle brake disc is connected to the weakening portion 2 through the first mounting hole 241. Preferably, the weakening portion 2 further includes a fourth connection surface 28, which is opposite to the second connection surface 24, and opposite sides of the fourth connection surface 28 is respectively connected to the first connection surface 23 and the third connection surface 25.

It should also be noted that the arrangement of the arc portion 21 can result in a significant height difference between the first connection surface 23 and the first positioning portion 3, which ensures that the fracture section remains within the area of the arc portion 21.

Specifically, the vehicle steering knuckle also includes a third positioning portion 5. The first positioning portion 3, the second positioning portion 4 and the third positioning portion 5 are arranged in a triangular shape on the connecting portion 1.

Preferably, the number of the arc portions 21 is two, and the two arc portions 21 are relatively arranged at opposite sides of the weakening portion 2.

In some possible embodiments, the number of the arc portion 21 is one, and the one arc portion 21 is set on the first connection surface 23 or the third connection surface 25. The number of the notches 22 is not limited, as long as the weakening portion 2 is easy to break. It can be seen that setting only one arc portion 21 can make the structure of the vehicle steering knuckle relatively simple and the production cost low. The strength of the vehicle steering knuckle can be met by the only one arc portion 21, and at the same time, it is easy for the vehicle steering rod to break the weakening portion 2 when the vehicle encounters a collision.

Specifically, one of the notches 22 can be seen as being set at a connection position of the first connection surface 23, the second connection surface 24, and the first positioning portion 3. Other one of the notches 22 can be seen as being set at a connection position of the third connection surface 25, the second connection surface 24, and the first positioning portion 3. The shape of the notch 22 can also depend on a planar space occupied by a brake disc installation point in the vehicle steering knuckle.

In other possible embodiments, the number of the arc portions 21 is four. That is, the first connection surface 23, the second connection surface 24, the third connection surface 25, and the fourth connection surface 28 are all equipped with one arc portion 21, which is located at an end near the first positioning portion 3 and connected to the first positioning portion 3. The four connection surfaces of the weakening portion 2 are all equipped with one arc portion 21, so that the weakening portion 2 is easier to break by the vehicle steering rod, which effectively reduces the degree of collision deformation of the vehicle door sill and effectively provides sufficient living space for drivers and passengers.

Specifically, a radius of the arc portion 21 is set according to an actual situation of the vehicle, and is not limited here.

In this embodiment, the radius of the arc portion 21 is 8 mm, so as to ensure the axial strength of the first positioning portion 3 while weakening a bending strength of the weakening portion 2. This makes the steering knuckle more prone to fracture while ensuring its own function, thereby reducing the degree of collision deformation of the vehicle door sill, and effectively providing sufficient living space for drivers and passengers.

In other possible embodiments, the arc portion 21 is S-shaped, and the arc portion 21 is provided in the middle of the weakening portion 2 so that the weakening portion 2 can be broken at the arc portion 21.

Specifically, the number of S-shaped arc portions 21 is at least one. If the number of the arc portions 21 is multiple, the orientation of multiple S-shaped arc portions 21 are identical, which makes the weakening portion 2 more easily broken. The S-shaped arc portion 21 is provided to make the weakening portion 2 easily broken by the vehicle steering rod, thereby reducing the degree of collision deformation of the vehicle door sill, and effectively providing sufficient living space for drivers and passengers.

Preferably, the weakening portion 2 includes a first connection surface 23, a second connection surface 24, and a third connection surface 25.

One end of the first connection surface 23 is connected to one end of the second connection surface 24, other end of the second connection surface 24 is connected to the third connection surface 25.

The first connection surface 23, the second connection surface 24, and the third connection surface 25 are all connected to a sidewall of the first positioning portion 3.

The second connection surface 24 is provided with a first mounting hole 241. A vehicle brake disc is connected to the weakening portion 2 through the first mounting hole 241.

In some possible embodiments, the first connection surface 23 is provided with at least one weakening groove, and the number of the weakening grooves is not limited, as long as the required strength of the vehicle steering knuckle is ensured. The weakening groove is provided to make the weakening portion 2 easily broken by the vehicle steering rod, thereby reducing the degree of collision deformation of the vehicle door sill, and effectively providing sufficient living space for drivers and passengers.

Preferably, one of the arc portions 21 is provided on the first connection surface 23, and the one of the arc portions 21 is provided at a connection position between the first connection surface 23 and the sidewall of the first positioning portion 3.

Other one of the arc portions 21 is provided on the third connection surface 25, and the other one of the arc portions 21 is provided at a connection position between the third connection surface 25 and the sidewall of the first positioning portion 3. Compared with the traditional steering knuckle structure, the collision deformation of the vehicle steering knuckle in this embodiment is easier to control, which resolves the long-term conflict between the weakening of the collision structure and the fatigue durability performance of the steering knuckle. By respectively arranging the arc portions 21 on opposite first connection surface 23 and third connection surface 25, and making weakening directions of the two arc portions 21 identical, and the weakening portion 2 easily broken by the vehicle steering rod, which reduces the degree of collision deformation of the vehicle door sill and effectively provides sufficient living space for drivers and passengers.

Preferably, a length of the connection position between the first connection surface 23 and the connecting portion 1 is a first length, and the first length is equal to a length of the arc portion 21 on the first connection surface 23.

A length of the connection position between the third connection surface 25 and the connecting portion 1 is a second length, and the second length is equal to a length of the arc portion 21 on the third connection surface 25.

Preferably, the weakening portion 2 further includes a fourth connection surface, which is opposite to the second connection surface 24, and the fourth connection surface is respectively connected to the first connection surface 23 and the third connection surface 25.

The fourth connection surface 28 is provided with a reinforcing rib 27 for strengthening the axial strength of the first positioning portion 3. The reinforcing rib 27 encloses a weakening groove 26 on the fourth connection surface 28, and the weakening groove 26 is configured for reducing the strength of the weakening portion 2.

Specifically, the number of the reinforcing ribs 27 is two, and the two reinforcing ribs 27 are connected for forming the weakening groove 26 on the fourth connection surface 28.

Furthermore, the reinforcing rib 27 is configured for strengthening the axial strength of the first positioning portion 3, and the weakening groove 26 can reduce the bending strength of the weakening portion 2 while the reinforcing rib 27 ensures the axial strength of the first positioning portion 3, so that in an event of a collision, the vehicle steering knuckle is pulled off by the vehicle steering rod at the weakening portion 2, which effectively reduces the degree of collision deformation of the vehicle door sill and effectively provides sufficient living space for drivers and passengers.

Specifically, the shape of the reinforcing rib 27 is set according to the structure of the vehicle steering knuckle, as long as the reinforcing rib can ensure the axial strength of the first positioning portion 3 while reducing the bending strength of the weakening portion 2. Its shape and size are not limited here.

In some possible embodiments, configuring the first connection surface 23 as a concave arc surface can result in a significant plane height difference between the surfaces connected with it. In conjunction with the weakening groove 26 enclosed by the reinforcing ribs 27, any cross-section of the first connection surface 23 passes through the weakening groove 26, so that any cross-section of the first connection surface 23 may be fractured, which reduces the bending strength of the weakening portion 2, making the vehicle steering knuckles more likely break.

Specifically, there are plurality of reinforcing ribs 2, and the plurality of reinforcing ribs 27 are arranged at intervals.

In some possible embodiments, a weakening hole is provided on the fourth connection surface, and the reinforcing rib surrounds the weakening hole.

In other possible embodiments, the reinforcing rib 27 has an arc-shaped structure, and the reinforcing rib 27 is at least partially curved.

Preferably, the first connection surface 23 is a concave are surface, and an orientation of the concave arc surface is identical to that of the arc portion 21, and the second connection surface 24 is a planar surface.

Preferably, the connecting portion 1 is provided with a second mounting hole 11, and a vehicle transmission shaft passes through the second mounting hole 11, so that the vehicle transmission shaft is connected to the connecting portion 1.

Preferably, the number of the notches 22 is two, each of the arc portions 21 is provided with one notch 22, and the notch 22 is configured in square, trapezoid or arc shape.

In some possible embodiments, the number of the notches 22 is several, and the several notches 22 are evenly spaced on the arc portion 21. The number of the notches 22 is not limited, as long as the required strength of the vehicle steering knuckle is ensured, and the number of notches 22 is not limited.

Specifically, a length of the notch 22 is no greater than 30% of a length of the arc portion 21. The length of the notch 22 is set according to the actual situation, as long as the strength of the vehicle steering knuckle is ensured and it is easy to break. Its length is not limited here.

Specifically, the positioning portion 3 is configured in cylindrical shape, and each of the arc portions 21 surrounds the sidewall of the first positioning portion 3.

Specifically, the vehicle steering knuckle is made of aluminum alloy. In this embodiment, the vehicle steering rod is loaded onto the arc portion 21, the notch 22, the reinforcing rib 27 and other fracture-inducing features of the vehicle steering knuckle, and pulls off the aluminum alloy vehicle steering knuckle along the fracture section, so that the wheels are laterally separated from the vehicle to unload the collision force, greatly reducing the collision strength requirements and the deformation degree of the vehicle door sill, and ultimately increasing the occupant living space and the collision integrity of the passenger compartment structure.

In other possible embodiments, the vehicle steering knuckle may also be made of steel or plastic.

On the other hand, the present document also provides a vehicle, which includes a vehicle steering rod, a vehicle front suspension frame, a vehicle transmission shaft, and a vehicle steering knuckle as described above.

The vehicle steering rod, the vehicle front suspension frame and the vehicle transmission shaft are respectively fixedly connected to the vehicle steering knuckle.

A vehicle with the vehicle steering knuckle is provided with a weakening portion 2, and an are portion 21 and a notch 22 on the weakening portion 2, so that when a collision occurs, the vehicle steering knuckle is pulled off by the vehicle steering rod at the weakening portion 2, which effectively reduces the degree of collision deformation of the vehicle door sill and effectively provides sufficient living space for the driver and passengers.

Although the present document has been described through preferred embodiments, the present document is not limited to the embodiments described here and may include various modifications and variations without departing from the scope of the present document.

In this article, the involved terms such as front, back, upper, lower and other directional words are defined based on the location of the components in the drawings and the positions of the components relative to each other, only for clarity and convenience in expressing the technical solution. It should be understood that the use of the directional words shall not limit the scope of protection claimed in the present document.

Without conflict, the above embodiments and the features in the embodiments can be combined with each other in this article.

The above disclosure is only a preferred embodiment of the present document. Of course, it cannot be used to limit the scope of the present document. Therefore, equivalent changes made in accordance with the claims of the present document still fall within the scope of the present document.

What is claimed is:

1. A vehicle steering knuckle, comprising a connecting portion, a weakening portion, a first positioning portion, and a second positioning portion;

the weakening portion and the second positioning portion being arranged on the connecting portion, the first positioning portion being configured for connecting with a vehicle steering rod;

one end of the weakening portion being fixedly connected to the connecting portion, other end of the weakening portion being fixedly connected to the first positioning portion, the weakening portion comprising at least one notch and at least one arc portion, the at least one arc portion being set at a connection position between the weakening portion and the first positioning portion, and the at least one notch being set at the arc portion, so that the vehicle steering rod can break the weakening portion in an event of a collision;

wherein the weakening portion comprises a first connection surface, a second connection surface, a third connection surface, and a fourth connection surface;

one end of the first connection surface is connected to one end of the second connection surface, other end of the second connection surface is connected to the third connection surface, the fourth connection surface is opposite to the second connection surface, and opposite sides of the fourth connection surface is respectively connected to the first connection surface and the third connection surface;

a reinforcing rib is arranged on the fourth connection surface to strengthen an axial strength of the first positioning portion, the reinforcing rib forms a weakening groove on the fourth connection surface, the weakening groove is configured for reducing a strength of the weakening portion.

2. The vehicle steering knuckle according to claim 1, wherein a number of the at least one arc portion is two, and the two arc portions are relatively arranged at opposite sides of the weakening portion.

3. The vehicle steering knuckle according to claim 2, wherein one of the two arc portions is arranged on the first connection surface, and the one of the two arc portions is arranged at a connection position between the first connection surface and a sidewall of the first positioning portion;

other one of the two arc portions is arranged on the third connection surface, and the other one of the two arc portions is arranged at a connection position between the third connection surface and the sidewall of the first positioning portion.

4. The vehicle steering knuckle according to claim 3, wherein a length of the connection position between the first connection surface and the connecting portion is a first length, and the first length is equal to a length of the arc portion set on the first connection surface;
a length of the connection position between the third connection surface and the connecting portion is a second length, and the second length is equal to a length of the arc portion set on the third connection surface.

5. The vehicle steering knuckle according to claim 1, wherein the first connection surface, the second connection surface, the third connection surface, and the fourth connection surface are connected to a sidewall of the first positioning portion;
the second connection surface is provided with a first mounting hole, and a vehicle brake disc is connected to the weakening portion through the first mounting hole.

6. The vehicle steering knuckle according to claim 1, wherein the first connection surface is an arc concave surface, and an orientation of the arc concave surface is identical to that of the arc portion, and the second connection surface is a planar surface.

7. The vehicle steering knuckle according to claim 1, wherein a second mounting hole is provided on the connecting portion, and a vehicle transmission shaft passes through the second mounting hole to connect the vehicle transmission shaft to the connecting portion.

8. The vehicle steering knuckle according to claim 1, wherein the number of the at least one notch is two, and each of the at least one arc portion is provided with one notch, the notch is configured in square, trapezoid, or arc shape.

9. A vehicle, comprising a vehicle steering rod, a vehicle front suspension frame, a vehicle transmission shaft and a vehicle steering knuckle;
the vehicle steering rod, the vehicle front suspension frame, and the vehicle transmission shaft being fixedly connected to the vehicle steering knuckle respectively;
the vehicle steering knuckle comprising a connecting portion, a weakening portion, a first positioning portion and a second positioning portion, the weakening portion and the second positioning portion being arranged on the connecting portion, the first positioning portion being configured for connecting with the vehicle steering rod, the second positioning portion being configured for connecting with the vehicle front suspension frame;
one end of the weakening portion being fixedly connected to the connecting portion, other end of the weakening portion being fixedly connected to the first positioning portion, the weakening portion comprising at least one notch and at least one arc portion, the at least one arc portion being set at a connection position between the weakening portion and the first positioning portion, and the at least one notch being set at the arc portion, so that the vehicle steering rod can break the weakening portion in an event of a collision;
wherein the weakening portion comprises a first connection surface, a second connection surface, a third connection surface, and a fourth connection surface;
one end of the first connection surface is connected to one end of the second connection surface, other end of the second connection surface is connected to the third connection surface, the fourth connection surface is opposite to the second connection surface, and opposite sides of the fourth connection surface is respectively connected to the first connection surface and the third connection surface;
a reinforcing rib is arranged on the fourth connection surface to strengthen an axial strength of the first positioning portion, the reinforcing rib forms a weakening groove on the fourth connection surface, the weakening groove is configured for reducing a strength of the weakening portion.

10. The vehicle according to claim 9, wherein a number of the at least one arc portion is two, and the two arc portions are relatively arranged at opposite sides of the weakening portion.

11. The vehicle according to claim 10, wherein one of the two arc portions is arranged on the first connection surface, and the one of the two arc portions is arranged at a connection position between the first connection surface and a sidewall of the first positioning portion;
other one of the two arc portions is arranged on the third connection surface, and the other one of the two arc portions is arranged at a connection position between the third connection surface and the sidewall of the first positioning portion.

12. The vehicle according to claim 11, wherein a length of the connection position between the first connection surface and the connecting portion is a first length, and the first length is equal to a length of the arc portion set on the first connection surface;
a length of the connection position between the third connection surface and the connecting portion is a second length, and the second length is equal to a length of the arc portion set on the third connection surface.

13. The vehicle according to claim 9, wherein the first connection surface, the second connection surface, the third connection surface, and the fourth connection surface are connected to a sidewall of the first positioning portion;
the second connection surface is provided with a first mounting hole, and a vehicle brake disc is connected to the weakening portion through the first mounting hole.

14. The vehicle according to claim 9, wherein the first connection surface is an arc concave surface, and an orientation of the arc concave surface is identical to that of the arc portion, and the second connection surface is a planar surface.

15. The vehicle according to claim 9, wherein a second mounting hole is provided on the connecting portion, and the vehicle transmission shaft passes through the second mounting hole to connect the vehicle transmission shaft to the connecting portion.

16. The vehicle according to claim 9, wherein the number of the at least one notch is two, and each of the at least one arc portion is provided with one notch, the notch is configured in square, trapezoid, or arc shape.

* * * * *